United States Patent
Rhee

(12) 
(10) Patent No.: US 6,367,955 B1
(45) Date of Patent: Apr. 9, 2002

(54) LIGHT FIXTURE APPARATUS WITH PAN RETAINER

(76) Inventor: Shin W. Rhee, 11626 Killimore Ave., Northridge, CA (US) 91326

( * ) Notice: Subject to any disclaimer, the term of this patent is extended or adjusted under 35 U.S.C. 154(b) by 0 days.

(21) Appl. No.: 09/545,600

(22) Filed: Apr. 7, 2000

(51) Int. Cl.⁷ .............................. F21S 8/04; F21V 21/02
(52) U.S. Cl. ....................... 362/368; 362/147; 362/217
(58) Field of Search ................................. 362/147, 148, 362/217, 364, 365, 368, 374

(56) References Cited

U.S. PATENT DOCUMENTS

| | | | |
|---|---|---|---|
| 3,004,148 A | 10/1961 | Rosolia et al. ............... | 362/319 |
| 3,210,538 A | 10/1965 | Picha et al. .................. | 362/282 |
| 3,263,071 A | 7/1966 | Fabrici ........................ | 362/355 |
| 3,330,952 A | 7/1967 | Wince et al. ................ | 362/322 |
| 3,380,770 A | 4/1968 | Risley ......................... | 292/175 |
| 3,748,460 A | * 7/1973 | Price ........................... | 362/368 |
| 4,039,822 A | * 8/1977 | Chan et al. .................. | 362/364 |
| 4,138,716 A | 2/1979 | Muhlethaler et al. ........ | 362/375 |
| 4,175,360 A | 11/1979 | Mulvey ....................... | 362/148 |
| 4,293,895 A | * 10/1981 | Kristofek .................... | 362/147 |
| 4,549,253 A | 10/1985 | Totten ......................... | 362/364 |
| 4,829,410 A | * 5/1989 | Patel ........................... | 362/147 |
| 5,171,085 A | 12/1992 | Jakscich ...................... | 362/147 |
| 5,440,470 A | 8/1995 | Ly ............................... | 362/341 |

* cited by examiner

Primary Examiner—Alan Cariaso
(74) Attorney, Agent, or Firm—Fulwider Patton Lee & Utecht

(57) ABSTRACT

A rectangular frame having side and end and side walls defining a downwardly opening receiving cavity for receipt upwardly therein of a pan having a laterally outwardly turned marginal flanges which overlie corresponding flanges in the frame and has mated mounting bores for receipt of mounting screws. Retains mounted on the opposite ends of the frame releasably engage the pan to hold it in position in the frame during shipping and storage and prior to mounting thereof.

27 Claims, 4 Drawing Sheets

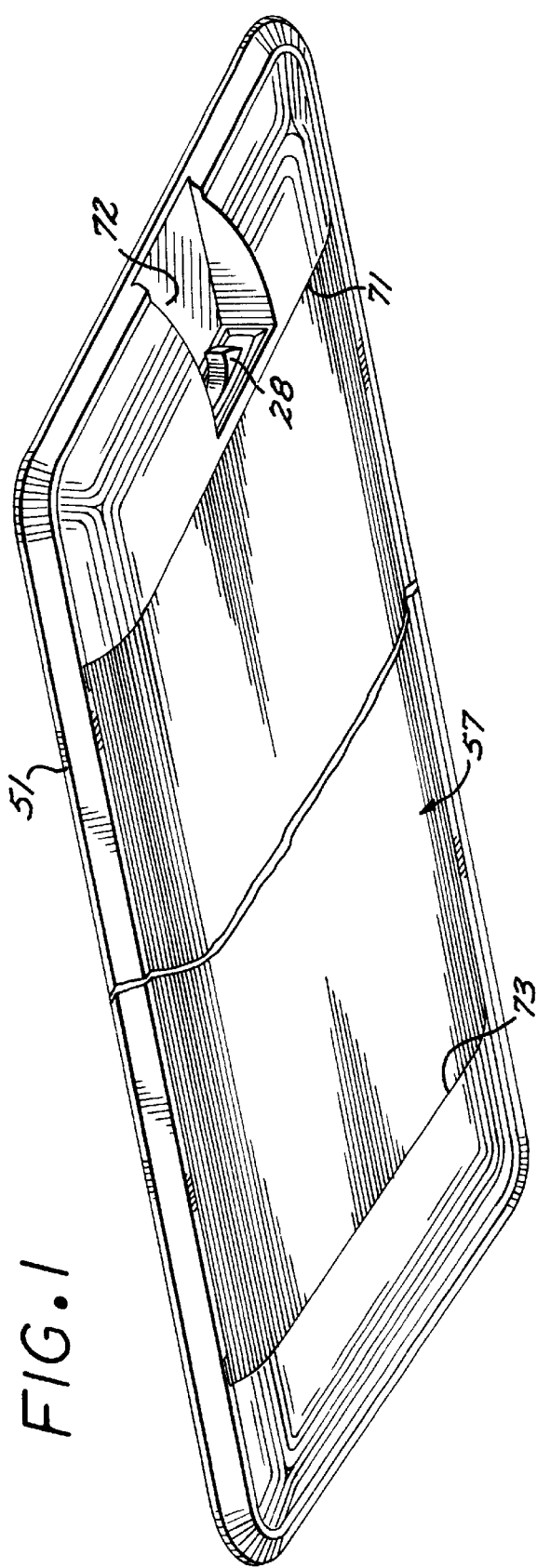
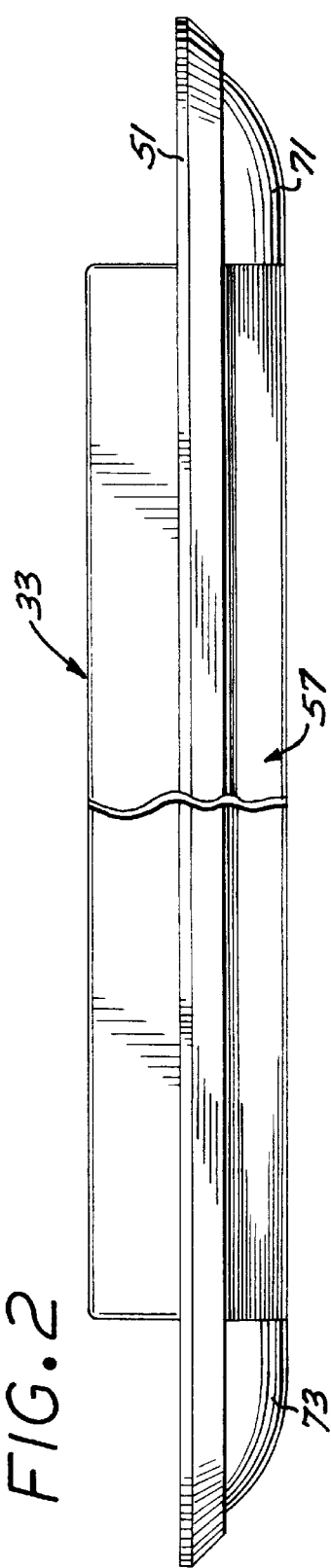

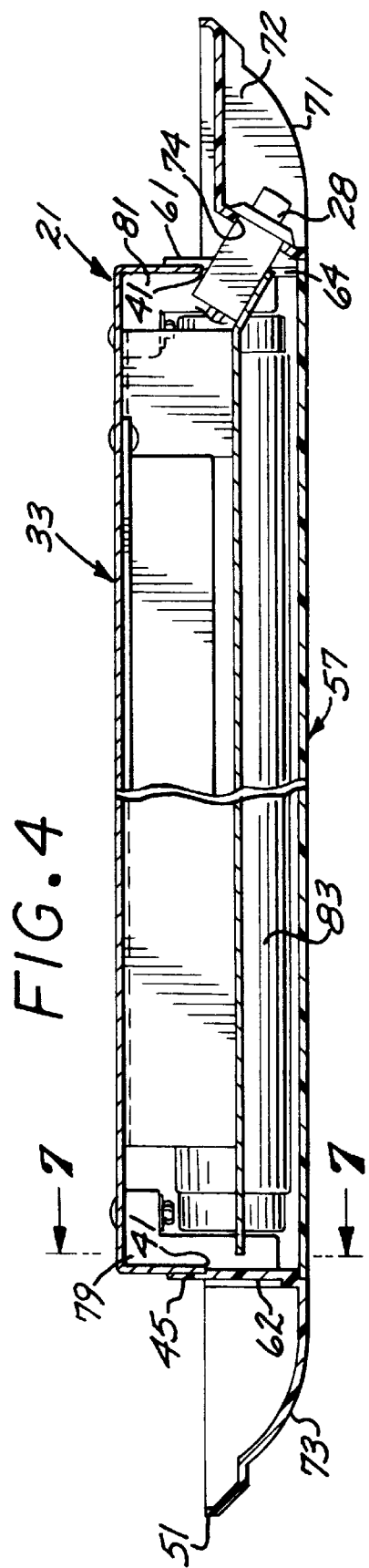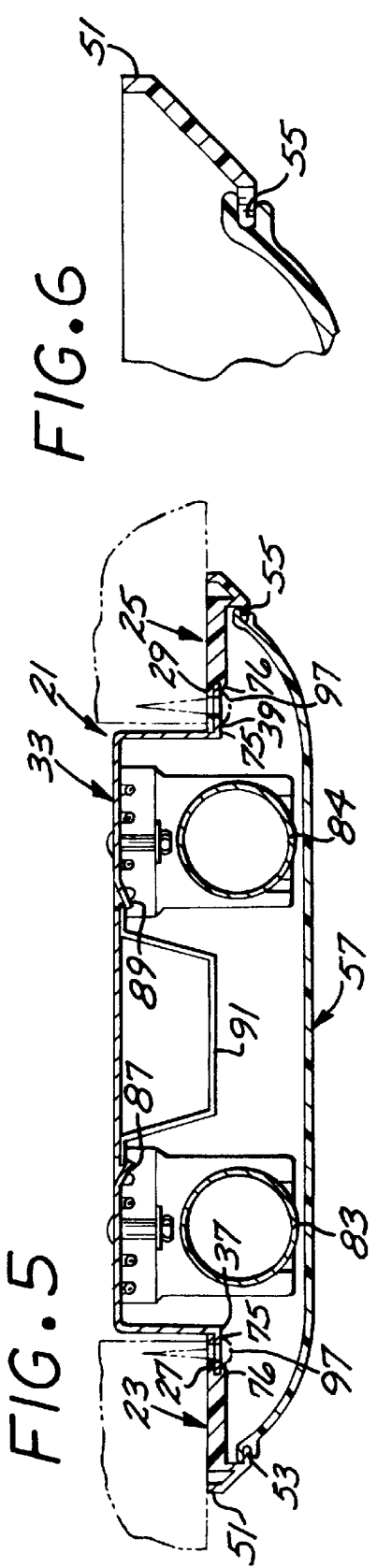

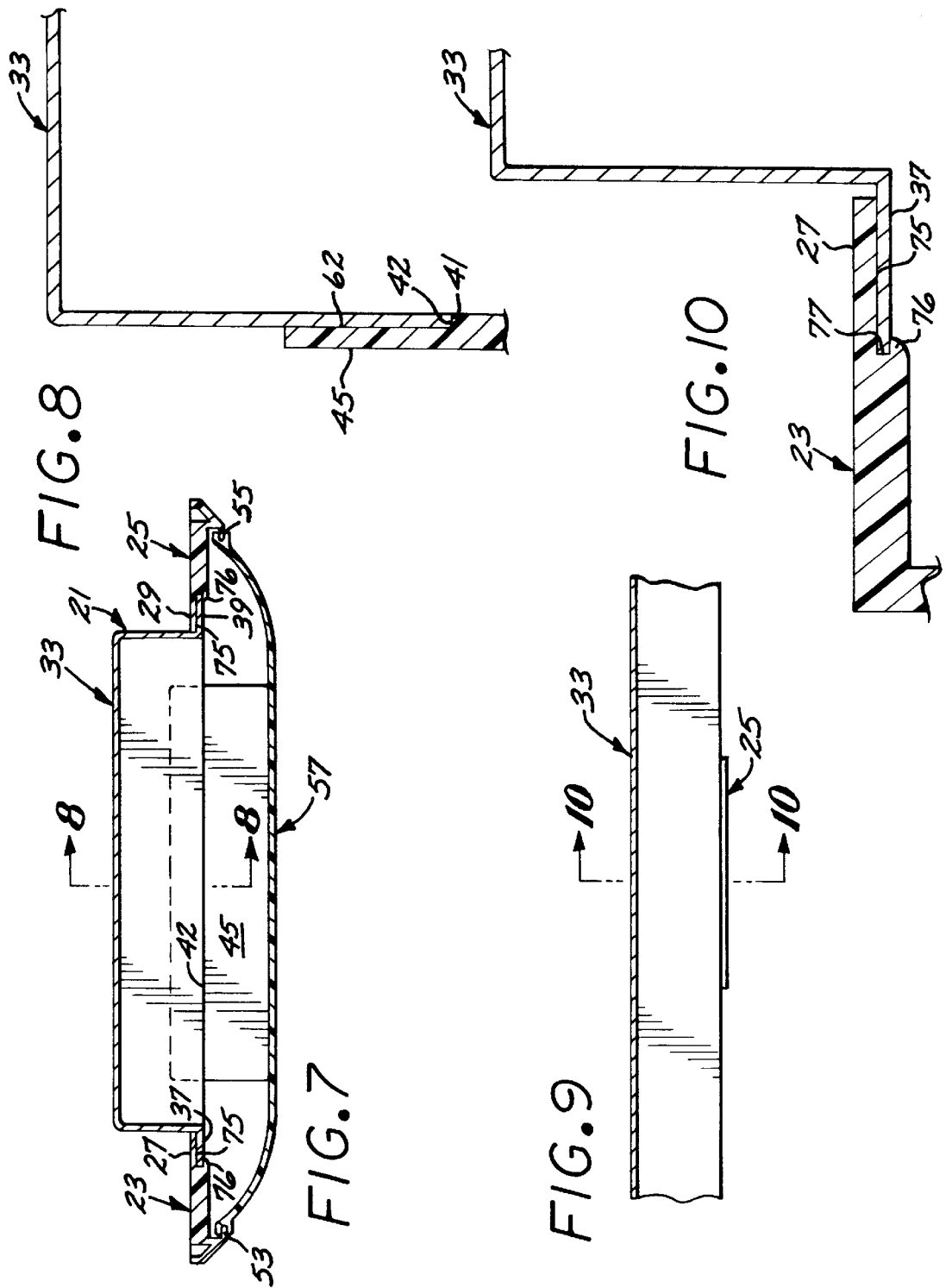

LIGHT FIXTURE APPARATUS WITH PAN RETAINER

BACKGROUND OF THE INVENTION

1. Field of the Invention

The present invention relates to light fixtures and more particularly to light fixtures typically used to mount fluorescent tubes.

2. Description of the Prior Art

Direct current, fluorescent light fixtures have become popular for use in various vehicles such as recreational vehicles, boats and long haul truck cabs. Such fixtures typically incorporate a light frame having a border thereabout for overlying the marginal edges of an opening formed for receipt thereof and configured to receive and mount to a pan typically mounting a pair of light tube sockets.

Various different arrangements have been proposed for mounting a light fixture frame to a light pan. It has been common practice that the light pan will be mounted to the support structure defining a recessed opening and the frame then secured to the light pan. An arrangement of this type is shown in U.S. Pat. No. 5,171,085 to Jaksich and assigned to the assignee of the instant application. Such devices, while having substantial commercial success, require separate assembly of the frame and light pan, along with individual fasteners.

Thus there exists a need for a light fixture including a frame and assembly which may be conveniently pre-assembled during the manufacturing process to adequately locate the parts relative to one another with the final securement of the parts taking place at the time of installation.

BRIEF DESCRIPTION OF THE DRAWINGS

FIG. 1 is a broken bottom perspective view of a light fixture apparatus embodying the present invention;

FIG. 2 is a broken front view of the light fixture apparatus shown in FIG. 1;

FIG. 4 is a longitudinal broken sectional view, in reduced scale, taken along the line 4—4 of FIG. 3;

FIG. 5 is a transverse sectional view, in reduced scale, taken along the line 5—5 of FIG. 3;

FIG. 6 is a detailed sectional view, in enlarged scale, showing a section of FIG. 5;

FIG. 7 is a transverse sectional view taken along the line 7—7 of FIG. 4;

FIG. 8 is a vertical sectional view, in enlarged scale, taken along the line 8—8 of FIG. 7;

FIG. 9 is a partial longitudinal sectional view, in enlarged scale, taken along the line 9—9 of FIG. 3; and FIG. 10 is a vertical sectional view, in enlarged scale, taken along the line 10—10 of FIG. 9.

SUMMARY OF THE INVENTION

Figure 3:
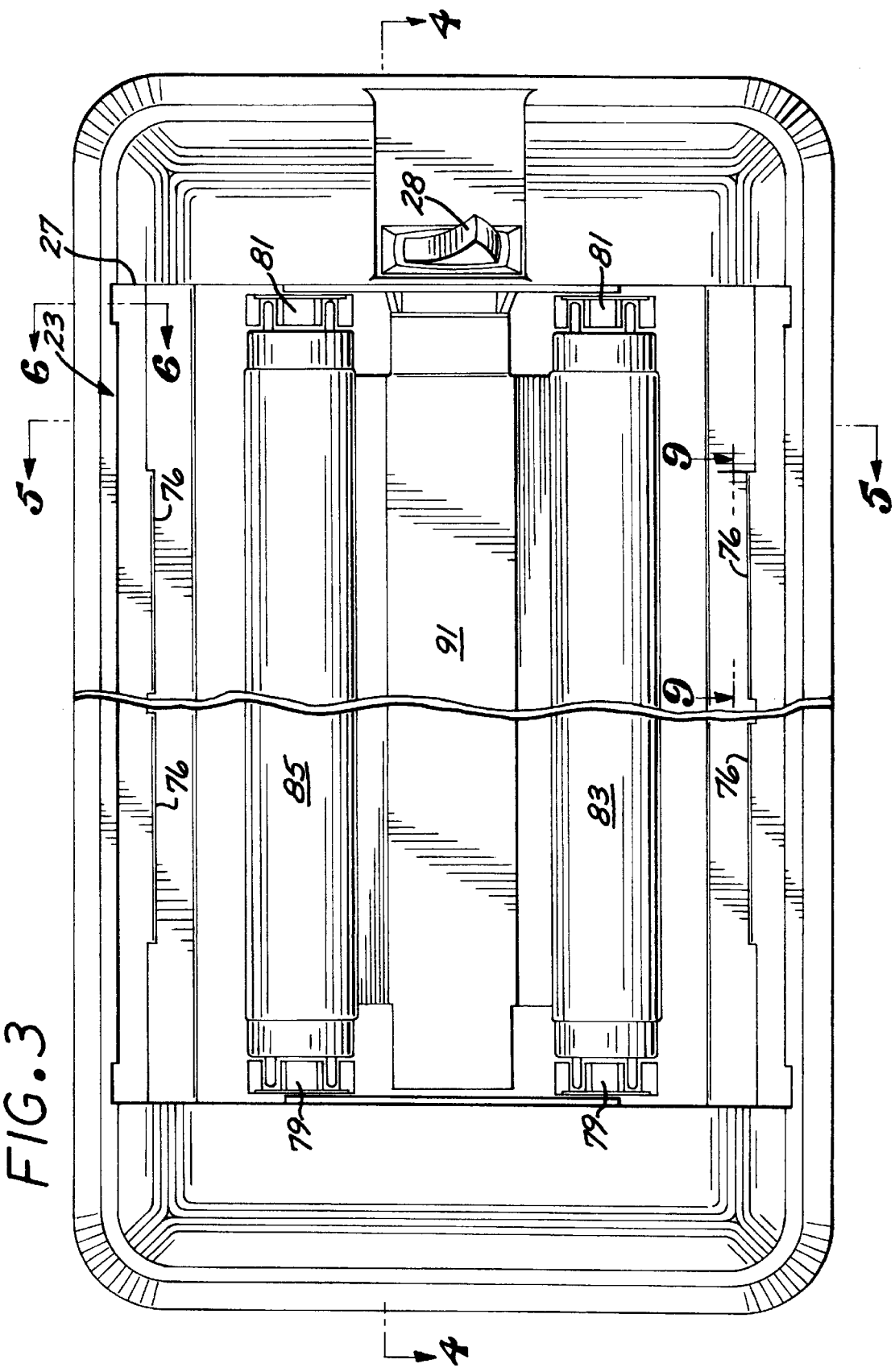
FIG. 3 is a broken bottom view, in enlarged scale, of the light fixture apparatus shown in FIG. 1 but with the lens removed.

The present invention is characterized by a light fixture of the type including a frame having a border for overlying the marginal edges of an opening cut for mounting thereof and including a pan configured with laterally disposed, outwardly flared mounting flanges which overlie mounting flanges on the frame. One or more retainers are interposed between the pan and frame and mounted to one or the other such that the pan may be loosely assembled during manufacture to be loosely held in position on such frame. On installation, the retainers will hold the pan generally in place relative to the frame so that mounting screws may be driven through the respective mounting flanges of the pan and frame to mount such frame and to hold the frame and pan assembled together.

DESCRIPTION OF THE PREFERRED EMBODIMENT

The light fixture apparatus of the present invention has particular utility for use in mounting fluorescent light tubes and is often used in vehicles having D.C. electrical systems, such as recreational vehicles like motor homes, boats and oftentimes in long haul truck cabs, for illuminating the interior thereof, particularly in the sleeping/bunk areas.

Referring to FIGS. 5 and 7, the light fixture of the present invention includes, generally, a rectangular frame work 21 having laterally disposed side rails 23 and 25 formed with respective inwardly projecting mounting flanges 27 and 29 and cooperating to form a rectangularly shaped, downwardly opening through passage defining an opening for receipt of a rectangularly shaped light socket mounting pan, generally designated 33 (FIGS. 8 and 10). Formed with such frame side rails is a retainer device comprised of longitudinally spaced inwardly directed retainer clips 76 spaced about $\frac{1}{16}$ of an inch below the respective frame flanges 27 and 29 to form inwardly opening notches 77 (FIG. 10). Mounted at one end of the frame 21 is a rocker switch 28. Mounted interiorly on the end of the frame 21 opposite the switch 28 is a retainer flange 45 undercut to form a horizontally extending upwardly facing retainer shoulder 42 against which the bottom abutment edge 41 of the end wall 43 of the pan 33 is seated to comprise an alternative retainer device. The pan 33 is formed along its laterally opposite sides with laterally outwardly turned mounting flanges 37 and 39, respectively, for underlying the respective frame flanges 27 and 29 so their outer edges may be received in the respective notches 77. Thus, in manufacture, the frame 21 and pan 33 may be manufactured separately and loosely assembled together at the manufacturing point by passing such pan 33 upwardly through the opening 31 to engage the pan flanges 37 and 39 underneath the frame flanges 27 and 29. Then, either or both of the retainer devices defined by the retainer rail clips 76 and the retainer shoulder 42 may be clipped underneath the respective pan flanges 37 and 39 and bottom edge 41 of the retainer flange 45, respectively, to loosely maintain such pan 33 and frame 21 assembled during storage and shipping. Upon installation, in the preferred embodiment, the flanges 27 and 37 and 29 and 39 will be in alignment such that mounting screws 97 (FIG. 5) may be inserted therethrough and driven into the structure surrounding a recessed cavity in, for instance, the top wall of a vehicle to secure such frame and pan together while mounting both against the structural wall.

The frame 21 may be constructed of any convenient material, such as thin plastic having a thickness of about 5 mm. Such frame, is typically configured with a peripheral border 51 (FIG. 1) sloped downwardly and inwardly to form a bezel around the perimeter thereof. Such frame is configured on the underside along its opposite sides with longitudinal inwardly turned flanges 53 and 55 (FIG. 7) terminating in laterally spaced apart confronting edges to be engaged by the opposite edges of the light lens, generally designated 57 (FIG. 6).

The frame 21 may be molded with the oppositely disposed side rails 23 and 25 formed integrally with the co-extensive inwardly projecting side mounting flanges 27 and 29. Such frame is formed with opposite end walls 61 and 62 (FIG. 4). The wall 61 is formed with a pair of laterally spaced apart vertical end pads 64 (FIG. 4) projecting downwardly on opposite sides of the control switch 28 spaced longitudinally from the wall 62 mounting the retainer flange 45 a distance corresponding with the length of the pan 33 to thus trap such pan lengthwise therebetween.

The frame is formed at its opposite extremities with downwardly projecting sculptured hoods 71 and 73 (FIG. 1) which curve upwardly and outwardly at the opposite lateral extremities to form an attractive appearance which compliments the channel shaped configuration of the diffuser lens 57. The hood 71 is formed centrally with a longitudinally outwardly opening, downwardly facing switch recess 72 having its longitudinally inner wall oriented vertically and formed with a through switch window 74 (FIG. 4).

Referring to FIGS. 7 and 10, the frame mounting flanges 27 and 29 are formed at their bottom sides with downwardly facing undercuts 75 for complemental receipt of the respective terminal edges of the flanges 37 and 39. Such undercuts are formed at their lateral outer extremities with the laterally inwardly opening notches 77 defining the respective clips 76 for trapping the lateral outer extremities of the respective pan mounting flanges 37 and 39 therein.

The pan 33 is generally rectangular, box-shape and may be constructed of sheet aluminum and may be formed with the walls thereof being somewhat flexible. Such pan mounts on the underside at the opposite ends thereof (FIGS. 4 and 5) respective longitudinally aligned light sockets, generally designated 79 and 81, for receipt of the opposite terminals of respective fluorescent light tubes 83 and 84. The top wall of the pan 33 is formed with downwardly bent, inwardly inclined bifurcated retaining clips 87 and 89 defining grooves spaced laterally apart for receipt of the opposite edges of a channel shaped ballast cover, generally designated 91 (FIG. 5).

In operation, it will be appreciated that the frame can be molded of thin wall construction so that the thin walls thereof may be highly flexible relative to one another and will define the opening for receipt of the light pan 33. The electronics will be mounted to the interior bottom side of the tray. The frame and pan may then be loosely assembled at the time of manufacture by inserting the body of the pan 33 upwardly into the opening 31 between the flanges 27 and 29, and between the opposite ends of the end walls of such frame. The rails 23 and 25 may be flexed outwardly so that the underhanging clips 76 formed by the undercut notches 77 will clear the laterally outer edges of the respective pan flanges 37 and 39 to allow such flanges to be aligned horizontally with the respective notches 77. It will be appreciated that the frame has sufficient flexibility so that the end wall 62 (FIG. 4) may also be flexed longitudinally outwardly to allow the confronting end wall 43 of the pan 33 to pass upwardly relative thereto to register the bottom edge 41 thereof with the upwardly facing shoulder 42 so that such shoulder will be snapped inwardly by the flex of the end wall 62 to engage under such edge to cooperate in holding the pan in place. Simultaneously, the rails 23 and 25 may then be flexed laterally inwardly to engage the marginal edges of the respective pan flanges with the respective notches 77 above the respective clips 76 and thereby aligning the mounting bores in the respective flanges 27 and 37 and 29 and 39. It will be appreciated that in some embodiments of the present invention only the clips 76 will be incorporated and in others only the retainer flange 45. It only being important that such pan be held temporarily in place on such frame. Typically a two part switch housing will be employed so that after the pan and frame are married together as described the connectors on the switch main housing may be connected to the wire connectors and the switch housing face introduced in the recess 72 to be positioned in the window 74 to snap onto the main housing. The diffuser 57 may then be inserted in place by merely flexing the laterally opposite side walls inwardly and engaging the marginal hanger flanges under the respective lens mounting flanges 55 (FIGS. 6 and 7).

The loosely assembled light fixtures may then be packaged and stored as desired. The packaged fixtures may be shipped in their loosely assembled conditions ready for installation. When a workman desires to install such fixtures, an opening in the overhead wall or the like may be formed to complementally receive the horizontal cross section of the body of the pan 33 upwardly thereinto. It will be appreciated that vertically aligned mounting bores may be preformed at the time of manufacture in the respective flanges 27 and 37 and 29 and 39 for receipt of mounting screws 97 (FIG. 5). Such screws will then serve to hold the pan and frame firmly in its assembled position while holding the assembled fixtures firmly from the overhead wall.

From the foregoing, it will be appreciated that the light fixture of the present invention is economical and convenient to construct and provides an aesthetically pleasing appearance. The pan may be assembled with the electrical components thereon and may be quickly married with the frame at the time of assembly. The pan will be held in place without the necessity of separate fasteners and can be packaged and shipped without disassembly and disassociation from one another. At the time of installation, the fixture may be conveniently removed from its packaging and the components will be held in place. The pre-assembled fixture may then be positioned in the desired mounting location and fasteners quickly driven through the overlying flanges of the frame and pan to firmly secure them together and secure the assembly to the mounting structure.

From the foregoing, it will be appreciated that the light fixture of the present invention is economical to manufacture, convenient to assemble and will provide a sturdy and long trouble free life.

What is claimed is:

1. Pre-assembled light fixture apparatus comprising:
   an elongated frame including frame end wall members and frame side rail members cooperating to form a downwardly facing pan receiving opening;
   a pan including a body to be advanced upwardly into said opening and including pan end wall elements and pan side flange elements for underlying juxtaposed the respective said frame end wall and frame side rail members; and
   at least one retainer device mounted on one of said members for removably snapping into engaging relation under at least one of said elements and operative to hold said pan assembled to said frame together as a unit to be bodily shifted as a unit toward a mounting structure to be affixed thereto.

2. Light fixture apparatus as set forth in claim 1 wherein:
   said frame side rail members are formed with mounting bores.

3. Light fixture apparatus as set forth in claim 2 wherein:
   said pan side flange elements are formed with through bores aligned with the respective said mounting bores.

4. Light fixture apparatus as set forth in claim 1 wherein:
   said pan is constructed of metal.

5. Light fixture apparatus as set forth in claim 1 wherein:

said frame is constructed of thermoplastic.

6. Light fixture apparatus as set forth in claim 1 wherein:

said frame side rail members each include a plurality of said retainer devices.

7. Light fixture apparatus as set forth in claim 1 wherein:

at least one said frame side rail member is configured with a laterally inwardly opening undercut forming a notch defining said retainer device; and said pan side flange elements are configured on their respective lateral outer edges to be complementally received in the respective said notches.

8. Light fixture apparatus as set forth in claim 1 that includes:

a retainer flange defining said retainer device mounted on at least one said frame end wall member.

9. Light fixture apparatus as set forth in claim 1 that includes:

retainer clips defining said retainer device mounted on the respective said side rail members.

10. Light fixture apparatus as set forth in claim 1 wherein:

said frame side rail members are flexible.

11. Light fixture apparatus as set forth in claim 1 wherein:

said frame end wall members are flexible.

12. Light fixture apparatus as set forth in claim 1 that includes:

respective retainer flanges mounted on the inside of said frame end wall members and formed with upwardly facing retainer shoulders for engaging the bottom edge of said body of said pan.

13. Light fixture apparatus as set forth in claim 12 wherein:

said frame side rail member includes laterally inwardly projecting clips to be snapped inwardly under the outer marginal edges of the respective said pan side flange elements.

14. A light fixture for mounting from a structure having a border defining a recessed cavity and comprising:

an elongated frame including side rails and end walls configured to form a downwardly opening pan-receiving opening, said side rails including frame mounting flanges turned inwardly to overlie the edges of said border and formed with frame mounting bores spaced therealong in a predetermined pattern;

a light pan formed with an upper body to be received complementally upwardly into said opening of said frame including laterally projecting pan mounting flanges for engaging under said frame mounting flanges, said pan including on at least one end a downwardly facing abutment edge; and a retainer flange mounted on one end wall of said frame in alignment with said abutment edge for engaging said edge to normally hold said pan in place relative to said frame, said retainer flange being selectively shiftable out of alignment with said abutment edge.

15. The light fixture of claim 14 wherein:

said side rails include respective clips configured to releasably engage under said pan mounting flanges.

16. The light fixture of claim 14 wherein:

said pan includes said downwardly facing abutment edges at both ends; and said frame includes said retainer flanges on both said end walls in alignment with respective said abutment edges for cooperating in holding said pan assembled to said frame.

17. The light fixture of claim 14 wherein:

said frame is constructed of plastic.

18. The light fixture of claim 14 wherein:

said frame is configured with at least one of said end walls flexible to provide for relative longitudinal movement between said retainer flange and said edge to shift said retainer flange out of alignment with said edge.

19. The light fixture of claim 14 wherein:

at least one of said frame is formed with said side rails and end walls flexible.

20. The light fixture of claim 16 wherein:

said frame is configured with said end walls flexible.

21. A method of mounting a light fixture including:

selecting a flexible frame having end wall members and side rail members cooperating to form a pan-receiving opening, said side rail members facing downwardly and including respective downwardly spaced retainer clips cooperating with such rail members to define inwardly opening notches;

selecting a pan mounting light tubes and having outwardly turned side flanges for being positioned in underlying relationship beneath said side rail members and terminating in laterally outwardly disposed edges removably received in said notches;

positioning said pan in said opening by flexing said side rail members laterally outwardly overlying said notches with said edges and releasing said side rail members to capture said edges in said notches to loosely assemble said frame and said pan to form said light fixture;

transporting said light fixture to an installation site; and installing said light fixture by driving fasteners through the respective said rail members and pan flanges.

22. Light fixture apparatus as set forth in claim 1 that includes:

frame mounting flanges formed on said frame side rail members and projecting inwardly therefrom;

said frame mounting flanges formed at their bottom sides with downwardly facing undercuts for complemental receipt of said pan side flange elements.

23. Light fixture apparatus as set forth in claim 22 wherein:

retainer clips project inwardly from said frame side rail members and are configured spaced horizontally below and generally parallel to said frame mounting flanges to form inwardly opening notches for removable receipt of said pan side flange elements.

24. Pre-assembled light fixture apparatus comprising:

a frame including frame end wall members and frame side rail members cooperating to form a downwardly facing pan receiving opening;

said frame side rail members having an upper surface and a lower surface and being configured on said lower surface with a laterally inwardly opening undercut to form respective inwardly projecting frame mounting flanges;

a pan including a body to be advanced upwardly into said opening and including pan end wall elements and pan side flange elements for underlying juxtaposed the respective said frame end wall and said frame mounting flanges; and at least one retainer clip mounted on one of said frame side rail members offset below and substantially parallel to said frame mounting flange to form a notch for removably snapping into engaging relation under at least one of said pan side flange elements to hold said pan and said frame together as a pre-assembled unit for subsequent installation onto a mounting structure.

25. Light fixture apparatus as set forth in claim 24, further comprising:

a downwardly facing abutment edge formed on at least one said pan end wall element;

at least one retainer shoulder formed on one said frame end wall member in alignment with said abutment edge for engaging said edge to hold said pan in place relative to said frame, said retainer shoulder being selectively shiftable out of alignment with said abutment edge.

26. Light fixture apparatus as set forth in claim 24, further comprising:

frame mounting bores spaced along said frame mounting flanges;

pan mounting bores formed in said pan side flange elements such that when said pan is assembled to said frame, respective said frame and pan mounting bores are aligned for insertion of a fastener therethrough to install said light fixture apparatus to a mounting structure.

27. Pre-assembled light fixture apparatus comprising:

a frame including frame wall members cooperating to form a downwardly facing pan receiving opening;

a pan including a body to be advanced upwardly into said opening and including pan flange elements for underlying juxtaposed the respective said frame wall members; and at least one retainer device mounted on one of said frame wall members for removably snapping into engaging relation under at least one of said pan flange elements to hold said pan assembled to said frame;

said frame wall members and pan flange elements formed with substantially aligned respective mounting bores such that fasteners may be inserted through said bores to install said light fixture on a mounting structure.

* * * * *